Figure 3:
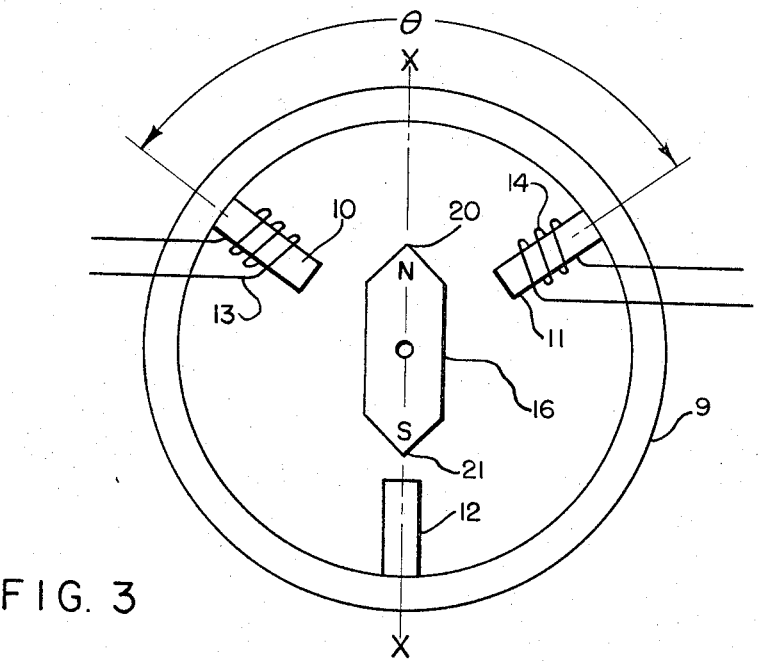

March 26, 1968  J. A. WATKINS ETAL  3,375,512
POWER-OFF INDICATOR
Filed March 19, 1965
4 Sheets-Sheet 1
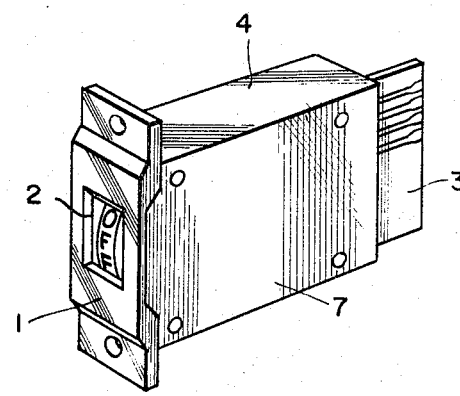
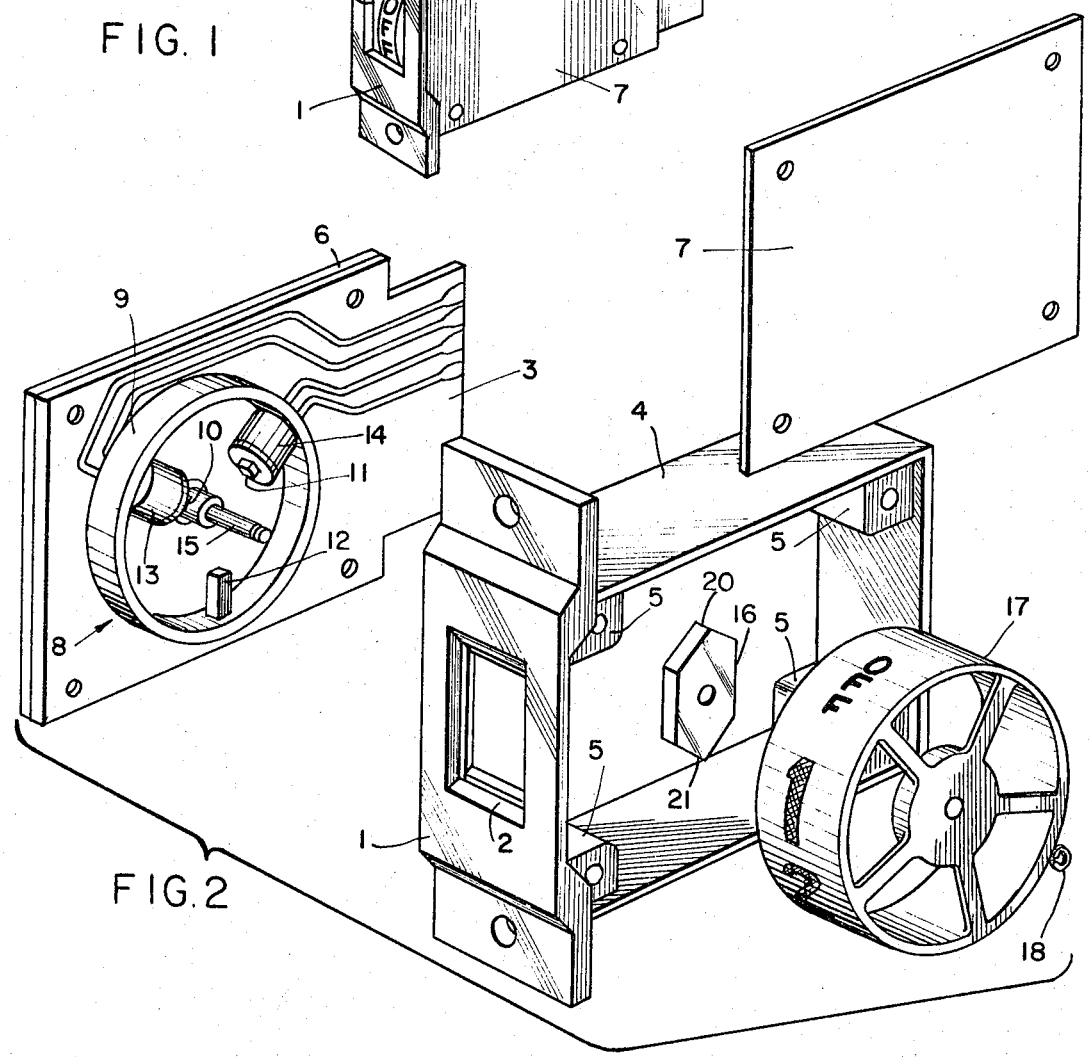
INVENTORS
JOHN A. WATKINS
ELLIOT R. LANG
BY
Weingarten, Orenbuch & Lahive
ATTORNEYS March 26, 1968

J. A. WATKINS ETAL 3,375,512

POWER-OFF INDICATOR

Filed March 19, 1965

4 Sheets-Sheet 2

INVENTORS
JOHN A. WATKINS
ELLIOT R. LANG
BY
*Weingarten, Ovenbuch & Lahive*
ATTORNEYS March 26, 1968

J. A. WATKINS ETAL 3,375,512

POWER-OFF INDICATOR

Filed March 19, 1965

4 Sheets-Sheet 4

INVENTORS
JOHN A. WATKINS
ELLIOT R. LANG

BY Weingarten, Ovenbuch & Lahive
ATTORNEYS

United States Patent Office 3,375,512
Patented Mar. 26, 1968

3,375,512
POWER-OFF INDICATOR
John A. Watkins, Cheshire, and Elliot R. Lang, Hamden, Conn., assignors to Patwin, Inc., a corporation of Connecticut
Filed Mar. 19, 1965, Ser. No. 441,193
4 Claims. (Cl. 340—373)

This invention relates in general to electromagnetically actuated indicators for displaying symbols that are selected by impressing electrical signals upon the indicator. More particularly, the invention concerns an indicator for presenting data in response to electrical signals, which reliably and promptly gives a positive indication of power failure or "power off." Such devices are generally termed "fail-safe" indicators or "failure flags" and are characterized by the ability to provide a positive indication in the event of the failure of the device itself or the system to which it is attached.

Conventional electromagnetically actuated indicators are constructed to respond to electrical signals by displaying characters in the window of the indicator. In the conventional electromagnetic indicator, the electrical signal usually determines which one of a plurality of symbols or characters is displayed in the window. Conventional electromagnetic indicators are of two general types. In one type, the actuating electrical signal need persist only for a length of time sufficient to permit a new symbol to be positioned in the window of the indicator. After the symbol is displayed, it is retained in the window even though the electrical signal is discontinued. This type of indicator is deemed to have an inherent "memory" as the display is retained in the absence of electrical commands. In the event of power failure, the indicator continues to present the symbol that was displayed in response to the last command received before the power failed. The second general type of electromagnetic indicator requires the actuating electrical signal to be present for the entire time that the symbol is to be displayed. This type of indicator has no "memory" and when a power failure occurs, the display tends to drift from one symbol to another.

The two general types of electromagnetic indicators are deficient in that neither type is capable of giving a positive indication of power failure. Uses have arisen for electromagnetic indicators where it is imperative that the indicators provide an immediate and reliable indication of power failure.

This invention pertains to an electromagnetic indicator for displaying data so long as an electrical signal is present and which provides a positive and immediate "flag" in the event of shut down, disconnection, or failure of the power source. The invention utilizes an electromagnetic stator having salient poles projecting radially inward from a circular ferromagnetic core. All but one of the radial poles are surrounded by windings arranged so that each pole and its winding, in effect, constitute an electromagnet. The radial poles of the electromagnets are arranged upon the core so that they are symmetric with respect to the one radial pole that does not have a winding. By selectively energizing individual windings of the stator, a plurality of discretely oriented magnetic fields can be established. The orientation of the established magnetic field determines the position of a rotor having a drum on which symbols are inscribed. The housing of the indicator has a window in which the symbols are displayed. Usually, the symbols are alpha-numeric characters and are of a size permitting only one character at a time to be fully presented in the window. In addition to the drum, the rotor has a permanent magnet that is of suitable form, the magnet being disposed within the enclosure of the circular core. The rotor is mounted so that the permanent magnet rotates about on axis that is at the geometrical center of the circular core. In the presence of a magnetic field established by the stator, the permanent magnet is constrained to turn the rotor to a position where the magnet is aligned with the established field. When the magnet is so aligned, one of the characters on the rotor's drum is fully displayed in the window of the indicator. In the absence of such a magnetic field, the rotor turns to a position where a magnetic circuit, which includes the ferromagnetic core of the stator, is established that offers the least reluctance to the magnetic flux of the permanent magnet. That is, when none of the windings of the stator are energized by an electrical signal, the rotor takes a position where the maximum flux linkage exists between the poles of the permanent magnet. Because of the arrangement of radial poles on the ferromagnetic core, a force is always present, in the absence of electrical energization of the stator, that causes the rotor to return to the position where the flux path for the permanent magnet permits maximum flux linkage. In the event, therefore, of failure or disconnection of electrical power to the windings of the stator, the rotor of the indicator assumes the position of maximum flux linkage. When in that position, an appropriate warning symbol on the drum is present in the window of the indicator.

Figure 4:
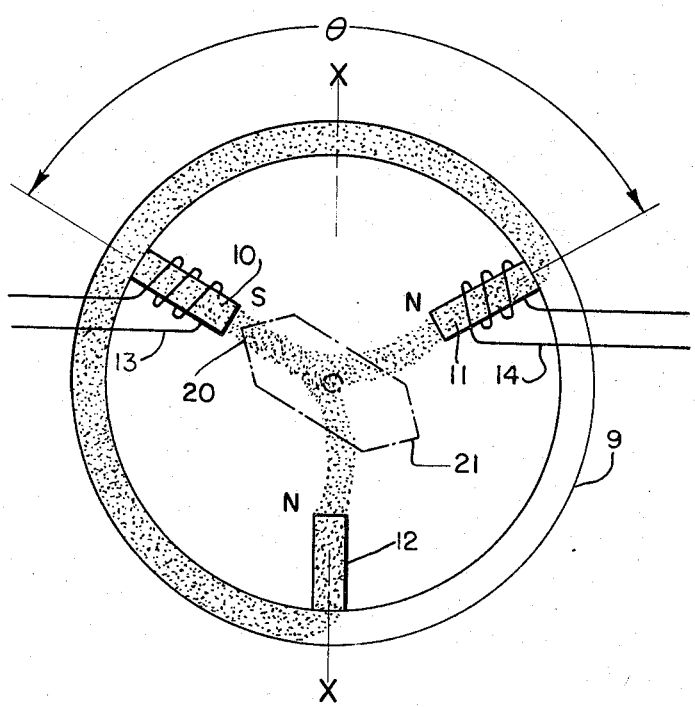
Figure 5:
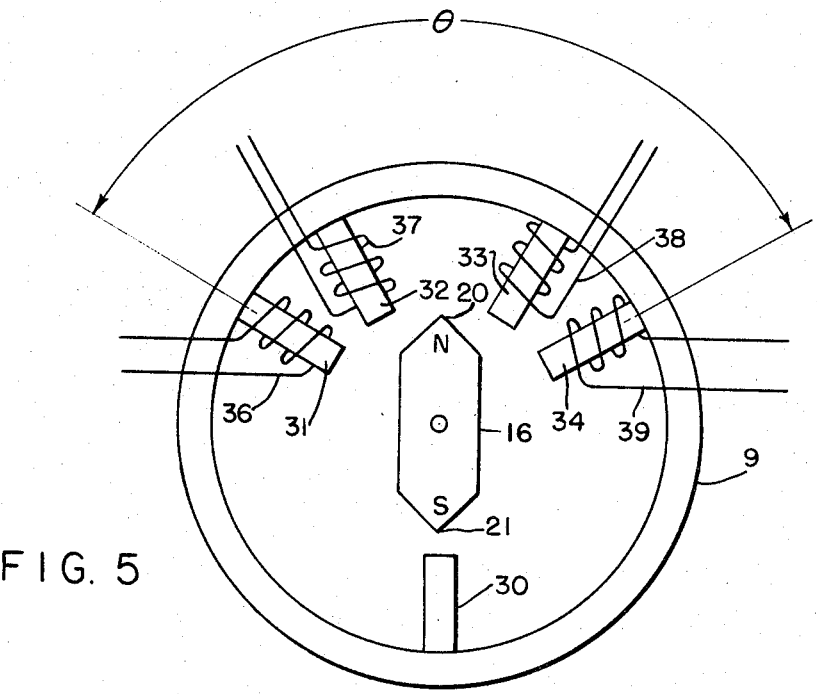
Figure 6:
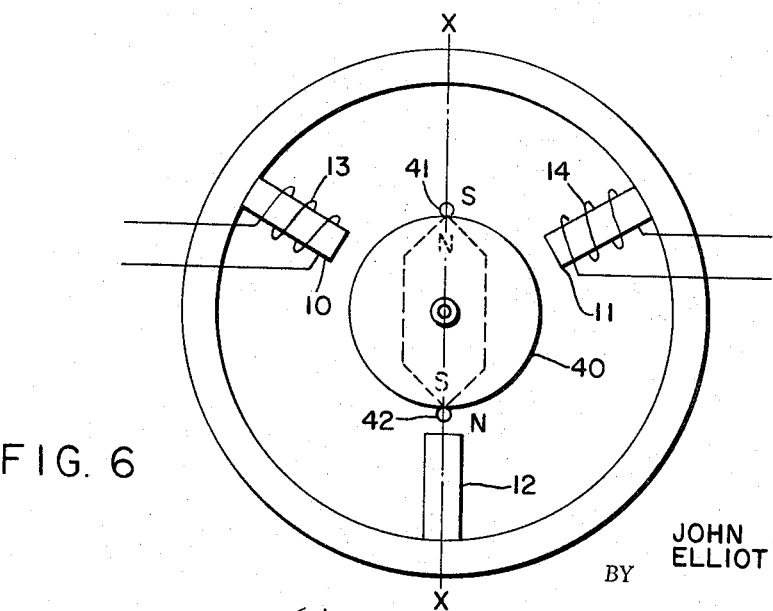
Figure 7:
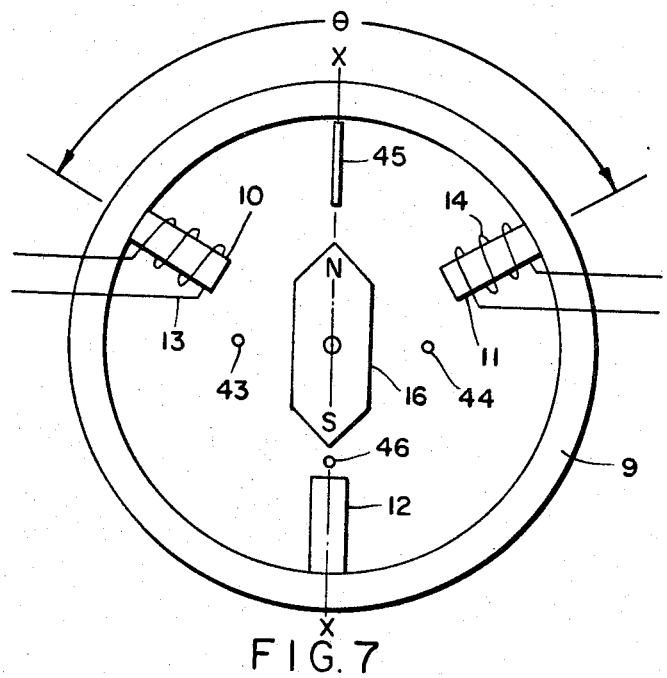
Figure 8:
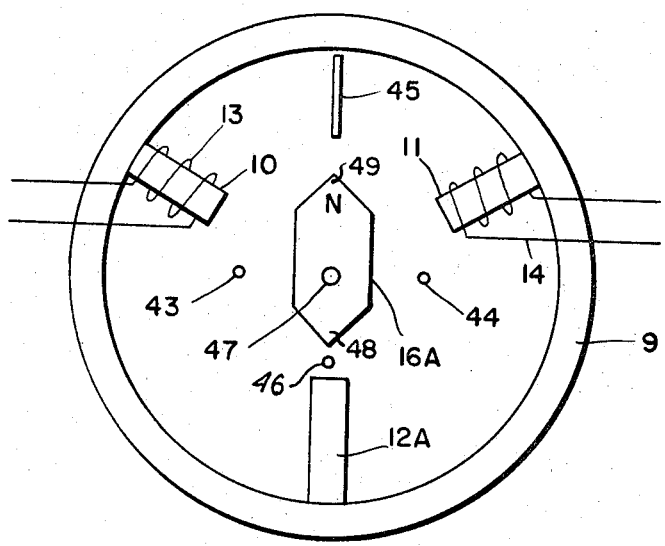

The invention, both as to its construction and mode of operation, can be better understood from a study of the following exposition which is intended to be read in connection with the accompanying drawings in which:

FIG. 1 depicts the invention in assembled form;
FIG. 2 is an exploded view showing the component parts of an embodiment of the invention;
FIG. 3 depicts the scheme of a stator employed in the invention;
FIG. 4 depicts the magnetic field established by an electrically energized winding of the stator;
FIG. 5 illustrates another stator permitting a larger number of symbols to be displayed by the indicator;
FIG. 6 illustrates the employment of an auxiliary magnet to provide a single OFF position;
FIG. 7 depicts a stator providing apparatus for aligning the rotor in the OFF position; and
FIG. 8 depicts another embodiment of the invention.

Referring now to FIG. 1, there is depicted an indicator having a front panel 1 containing a window 2 in which the warning flag or other data is presented. Electrical signals are impressed upon the indicator through the terminals of a printed circuit board 3 extending from the rear of the indicator housing.

From the exploded view shown in FIG. 2, it is apparent that the indicator housing employs a hollow rectangular body 4 having posts 5 at its corners. The posts are internally threaded and, when the indicator is assembled, end plates 6 and 7 are secured to opposite sides of body 4 by screws which engage the threaded posts. Printed circuit board 3 has its wiring protected by an insulative coating and the board is preferably clamped against the body 4 by end plate 6. As several indicators may be mounted side by side or an indicator may be used in an environment where external magnetic fields of appreciable strength are present, the end plates are, preferably, fabricated of a material of high magnetic permeability to provide a magnetic shield. Secured to circuit board 3 is a stator 8 utilizing a ferromagnetic annular core 9 having three radial inwardly protruding poles 10, 11, and 12. A pair of windings 13 and 14 surmount two of the radial poles and each winding is connected to terminals on printed circuit board 3 in a manner permitting the windings to be separately energized. Radial poles 10 and 11 are arranged on ferromagnetic core 9 so that they are symmetric with respect to radial pole 12. Winding 13 is mounted on radial pole 10 and winding 14 is mounted on radial pole 11, but radial pole 12 does not carry a winding.

Secured to board 3 and extending through the geometric center of annular core 9 is a shaft 15. In the assembled apparatus, a rotor is mounted to turn about the shaft. The rotor employs a permanent magnet 16 attached to a drum 17. The periphery of the drum is marked with symbols that are to be displayed in the window of the indicator. Usually the symbols are alpha-numeric characters and are of a size permitting only one character at a time to be fully presented in the window. The magnet is rigidly attached to the drum so that the two members constitute a rotor which turns as an integral unit. The magnet and drum are provided with central apertures to permit the rotor to be mounted over shaft 15. When so mounted, the drum encircles the annular core whereas the magnet is disposed so that it is within the enclosure of the annular core. To retain the rotor so that it cannot slip off the shaft, a groove is provided adjacent the end of the shaft for accommodating a C-shaped lock member 18.

As shown in FIG. 3 permanent magnet 16 is essentially a bar magnet having wedge shaped poles 20 and 21. The salient poles 20 and 21 tend to concentrate the magnetic flux and define the North and South magnetic poles of the permanent magnet. The apices of the wedges constitute "salient" poles of the magnet in the sense that the magnetic field of the magnet is most intense in the immediate vicinity of two diametrically opposite points on the magnet. While magnet 16 is preferably of the illustrated shape, it may take other forms without materially affecting the manner of the indicator's operation. For example, the permanent magnet may be circular in form and have soft iron rods attached to it at diametrically opposite locations to concentrate the magnet flux and define the North and South magnetic poles of the permanent magnet.

Assuming winding 13 to be energized by an electric signal that causes radial pole 10 to become a South magnetic pole, then radial poles 11 and 12 become North magnetic poles and a magnetic field is established by the stator having the configuration indicated in FIG. 4. Under the constraint of that magnet field, the rotor turns until the North pole of the permanent magnet is aligned with radial pole 10 and the rotor remains in that position so long as the winding remains energized. In that position, the numeral 1, for example, on the drum is fully presented in the indicator's window.

If the winding 13 were energized by an electrical signal that caused radial pole 10 to become a North magnetic pole, then radial poles 11 and 12 would become South magnetic poles. Thereupon, the rotor would turn through 180° and would come to rest at the position where the South pole of the permanent magnet is aligned with radial pole 10. The rotor would remain in that position as long as winding 13 were electrically energized. In that position, another character, such as the numeral 2, would be fully presented in the indicator's window.

Merely by controlling the polarity of the electrical signal applied to winding 13, the rotor can be caused to assume either of two positions. The winding 14 on radial pole 11, similarly, affords two more positions for the rotor at which different symbols can be displayed in the window.

Upon de-energization of the winding, as by a power failure, the magnetic field established by the stator collapses. The permanent magnet, free of the restraint imposed by the stator's magnetic field, turns to the position where the poles of the magnet are aligned with radial pole 12. As the permanent magnet has two positions where its poles are aligned with the radial pole 12, it may assume the position illustrated in FIG. 3 where its South magnetic pole is closer to radial pole 12, or it may assume the position where its North magnetic pole is closer to radial pole 12. The position which the magnet assumes, when the stator is de-energized, depends upon which magnetic pole of the permanent magnet is closest to radial pole 12 at the time the power is turned off. In either of the two "power-off" positions a warning indication is presented in the indicator's window. The warning indication may, for example, be the word OFF inscribed over a red background. The drum of the indicator, therefore, carries the warning indication upon its periphery at two locations that are 180° apart.

The permanent magnet, in the event of shut down, disconnection, or failure of the electrical power supplied to the windings of the stator, assumes the position where its poles are aligned with radial pole 12 because in that position the magnetic circuit for the flux of the permanent magnet is in the state of highest permeability. Stated another way, the permanent magnet, in the absence of a magnetic field established by a winding of the stator, seeks the position where the maximum flux linkage between the magnet's poles occurs. With the stator depicted in FIG. 3, the requirements to achieve that operation are that the stator be symmetrical about the X—X axis, that the angle $\theta$ between radial poles 10 and 11 be less than 120°, and that the core not be magnetically saturated by the flux of the permanent magnet. Assuming these requirements to be met, when a power failure occurs or the power is otherwise interrupted, a torque is always present which acts to turn the rotor to align the magnet's poles with radial pole 12.

The stator depicted in FIG. 3 affords four fixed "power-on" positions for the rotor in addition to the "power-off" position. To obtain more "power-on" positions additional radial poles and windings can be employed. FIG. 5, for example, shows a stator having five radial poles 30, 31, 32, 33, 34, protruding equal distances inwardly from ferromagnetic annular core 35. Radial poles 31, 32, 33, and 34 are arranged symmetrically on the core with respect to radial pole 30. Windings 36, 37, 38, and 39 are disposed upon radial poles 31, 32, 33, and 34, respectively, whereas radial pole 30 has no winding. The windings are connected to printed wiring on the circuit board so that the windings can be separately energized by the electrical signals that may be of either polarity. The four energizable electromagnets, constituted by the radial poles 31, 32, 33, and 34 and their windings, permit a maximum of twelve "power-on" positions for the rotor whereby a maximum of twelve different symbols can be positioned in the window of the indicator in addition to the "power-off" indication. When separately energized, each electromagnet can cause the rotor to assume either of two fixed positions, depending upon the polarity of the electrical signal applied to the winding. Further, by energizing windings 36 and 37 simultaneously with signals of the same polarity, the permanent magnet assumes a fixed position with one of its poles located between radial poles 31 and 32. Similarly, energizing windings 38 and 39 together with signals of the same polarity, causes the permanent magnet to assume a fixed position where one of its poles is between radial poles 33 and 34.

In a stator having more than three radial poles, the requirement that the angle $\theta$ shall not exceed 120° need not be observed. The outermost electromagnets 31 and 34, in FIG. 5 for example, may be separated by more than 120°. The amount that the angle $\theta$ can exceed 120° and still have the permanent magnet return to the position where its poles are aligned with radial pole 30 when the power is turned off, depends in some measure upon the positions of radial poles 32 and 33 and upon the configuration of magnet 16. In no event, however, should the angle $\theta$ be made as great at 180°.

Obviously, variations of the invention are possible in the light of the foregoing teaching. For example, to insure a single "power-off" position for the rotor, an auxiliary magnet 40 can be fixed in position as indicated in FIG. 6.

Preferably, magnet 40 is a permanent magnet of circular configuration having soft iron rods 41 and 42 sharply defining its North and South magnetic poles, the magnet's poles being aligned with the X—X axis. Auxiliary magnet 40, being a disc, may be fixed upon the shaft 15 (FIG. 2) or it may be cemented to the circuit board 3. The auxiliary magnet causes magnet 16, when no power is applied to the stator's windings, to assume a position in which the North and South poles of the rotor's magnet are adjacent the oppositely polarized poles of the auxiliary magnet. When a winding of the stator is energized, the magnetic field established by the stator is of such intensity that the field of the auxiliary magnet is overridden. The energized stator, therefore, entirely controls the "power-on" position of the rotor. With the stator deenergized, magnet 16 seeks the position where the maximum flux linkage between the magnet's poles occurs and where its poles are adjacent to the oppositely polarized poles of auxiliary magnet 40. By employing an auxiliary magnet 40 of appropriate magnetic intensity relative to the intensity of magnet 16, the rotor will assume a single invariable position when the power to the indicator is off. Magnet 40, in addition to assuring a single OFF position for the rotor also provides precise alignment of magnet 16 with the X—X axis when the stator is de-energized. That is, the OFF symbol is squarely presented in the window of the indicator when the power is off because magnet 16 is held precisely in the position where its salient poles are over the soft iron rods 41 and 42 of the auxiliary magnet. This precise alignment with the X—X is referred to as "indexing" of the rotor.

FIG. 7 illustrates a scheme for indexing the rotor and providing for a single OFF position without requiring an auxiliary magnet. To restrict the magnet 16 to a rotational arc equal to or slightly greater than the angle θ, a pair of posts 44 and 45 are fixed in position upon the printed circuit board and are located so as to intercept the magnet 16 at its limits of arcuate motion. The North pole of magnet 16, as depicted in FIG. 7, is prevented by posts 44 and 45 from reaching a position where it is closer to radial pole 12 than the South pole of the magnet.

With the arrangement of FIG. 7, magnet 16 can assume only three stationary positions. When winding 13 is electrically energized so that radial pole 10 becomes a South magnetc pole, the North pole of magnet 16 is attracted to it and the magnet therefore turns until it is aligned with pole 10. Similarly, when winding 14 is electrically energized to cause radial pole 11 to become a South magnetic pole, the permanent magnet turns to align itself with pole 11. When the windings 13 and 14 are not electrically energized, the magnet takes the position where it is aligned with the X—X axis as depicted in FIG. 7. To insure that the magnet is properly indexed, a thin magnetizable rod 45 is arranged to extend longitudinally along the X—X axis. The rod 45, being of high magnetic permeability, decreases appreciably the reluctance of the magnetic flux circuit which extends from the North pole of permanent magnet 16 through rod 45 to the core 9 and then extends from radial pole 12 to the South pole of the permanent magnet. To concentrate the magnetic flux adjacent the tip of radial pole 12, a steel rod or wire 46 is interposed between pole 12 and the South magnetic pole of magnet 16. The rod 45 or the rod 46 may, of itself, suffice to index the rotor in the OFF position, but the use of both rods together gives excellent results and is the preferred construction.

An embodiment of the invention is depicted in FIG. 8 that, essentially, is a modification of the indicator depicted in FIG. 7. In the modified structure, radial pole 12A is materially longer than radial poles 10 and 11. Permanent magnet 16A is eccentric with respect to its axis of rotation 47 so that its magnetic pole 48 is closer to the axis than is magnetic pole 49. Because pole 48 is closer to the rotational axis than pole 49, rotation of the magnet causes pole 48 to move a lesser distance than pole 49. By that arrangement, the distance of pole 48 from radial pole 12A at the limits of movement of permanent magnet 16A is less than the comparable distance in the embodiment of FIG. 7. Where the permanent magnets are of equal strength, the arrangement of FIG. 8 is somewhat faster in returning the rotor to the OFF position than is the arrangement of FIG. 7.

Because variations in embodiments of the invention are possible in the light of the foregoing teaching, it is intended that the invention not be limited to the details of construction and arrangement of parts specifically described or illustrated. Rather, it is intended that the scope of the invention be delimited by the appended claims and encompass such structures as do not in essence depart from the invention there defined.

What is claimed is:
1. An indicator comprising:
 (1) a panel having a window for displaying data;
 (2) a rotor having a permanent magnet and a drum bearing symbols on its periphery, the permanent magnet having salient North and South magnetic poles, the drum being positioned to present the symbols in the window upon rotation of the rotor;
 (3) a stator having a ferromagnetic anular core carrying a first inwardly protruding radial pole and a plurality of other inwardly protruding radial poles that are symmetrical with respect to the first radial pole, the other radial poles being secured within a 180° segment of the core and the first radial pole protruding from the opposite 180° core segment, the stator further including a plurality of windings arranged to permit each winding to be separately energized by an electrical signal, each winding being mounted upon a different one of the other radial poles; and
 (4) means supporting the rotor so that the permanent magnet is within the enclosure of the annular core.
2. A power failure indicator comprising:
 (1) a panel having a window for displaying data;
 (2) a rotor having a permanent magnet and a drum bearing symbols on its periphery, the permanent magnet having salient North and South magnetic poles, the drum being positioned to present the symbols in the window upon rotation of the rotor;
 (3) a stator having a ferromagnetic core carrying three inwardly protruding radial poles, two of the radial poles being spaced apart by less than 120° and being symmetrical with respect to the third radial pole, the stator further including a pair of windings, each of the windings being mounted upon a different one of said two radial poles;
 (4) means providing electrical connections to the windings and permitting each winding to be separately energized by an electrical signal; and
 (5) means supporting the rotor so that the permanent magnet is within the enclosure of the annular core.
3. A power failure indicator comprising:
 (1) a panel having a window for displaying data;
 (2) a rotor having a permanent magnet and a drum bearing symbols on its periphery, the permanent magnet having salient North and South magnetic poles, the drum being positioned to present the symbols in the window upon rotation of the rotor;
 (3) a stator having a ferromagnetic annular core carrying a first inwardly protruding radial pole and four other inwardly protuding radial poles that are symmetrical with respect to the first radial pole, the four other radial poles being secured within a 180° segment of the core and the first radial pole protruding from the opposite 180° core segment, each of the four other radial poles having a winding thereon;
 (4) means providing electrical connections to the windings and permitting each winding to be separately energized by an electrical signal; and

(5) means supporting the rotor so that the circular magnet is within the enclosure of the annular core and is maintained concentric with the core upon rotation of the rotor.

4. A power failure indicator comprising:
(1) a panel having a window for displaying data;
(2) a rotor having a permanent magnet secured to a drum which has symbols on its periphery, the permanent magnet having salient North and South poles, the drum being positioned to present the symbols in the window upon turning of the rotor;
(3) a stator having a ferromagnetic annular core carrying a first inwardly protruding radial pole and a plurality of other inwardly protruding radial poles that are symmetric with respect to the first radial pole, the other radial poles being secured within a 180° segment of the core and the first radial pole protruding from the opposite 180° core segment, the stator including a plurality of windings, each winding being mounted upon a different one of the other radial poles and being separately energizable by an electrical signal;
(4) means supporting the rotor so that the rotor's permanent magnet is within the enclosure of the annular core; and
(5) magnetizable means interposed between the permanent magnet and the core, the magnetizable means being aligned with the first radial pole to hold the rotor in a precise position when the windings are electrically de-energized.

References Cited

UNITED STATES PATENTS

| | | | |
|---|---|---|---|
| 2,181,803 | 11/1939 | Faus | 340—248 |
| 2,541,830 | 2/1951 | Phaneuf | 310—164 |
| 2,844,316 | 7/1958 | Liebknecht | 310—49 X |
| 2,867,762 | 1/1959 | Lehman et al. | 310—49 X |
| 3,109,167 | 10/1963 | MacIntyre et al. | |
| 3,183,503 | 5/1965 | Casey | 310—49 X |
| 2,367,299 | 1/1945 | McLarn | 340—373 |
| 3,210,758 | 10/1965 | Huston | 340—373 |

FOREIGN PATENTS 168,776   10/1959   Sweden.

JOHN W. CALDWELL, *Primary Examiner.*

NEIL C. READ, *Examiner.*

I. J. LEVIN, A. J. KASPER, *Assistant Examiners.*